(12) United States Patent
Erickson et al.

(10) Patent No.: US 6,786,119 B1
(45) Date of Patent: *Sep. 7, 2004

(54) TOOLHOLDER ASSEMBLY

(75) Inventors: Robert A. Erickson, Raleigh, NC (US); William M. Long, Blairsville, PA (US)

(73) Assignee: Kennametal PC Inc., Monrovia, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 09/723,918

(22) Filed: Nov. 28, 2000

Related U.S. Application Data

(63) Continuation of application No. 09/388,259, filed on Sep. 1, 1999.

(51) Int. Cl.[7] .......................... B23B 29/00; B23B 29/04
(52) U.S. Cl. ...................... 82/158; 82/160; 403/374.3; 407/101; 407/104
(58) Field of Search .................. 82/158, 160; 407/104, 407/46, 101, 102; 403/374.3, 374.2, 379.4, 16; 411/24, 25, 27, 28; 279/148

(56) References Cited

U.S. PATENT DOCUMENTS

| | | | | |
|---|---|---|---|---|
| 1,050,385 | A | * 1/1913 | Palmgren ..................... | 403/16 |
| 1,994,791 | A | * 3/1935 | Sanderson ................... | 279/97 |
| 2,485,799 | A | 10/1949 | Woytych | |
| 2,667,687 | A | 2/1954 | Clarkson | |
| 3,301,581 | A | * 1/1967 | Winberg .................. | 403/379.4 |
| 4,573,824 | A | 3/1986 | Ehle | |
| 4,575,293 | A | 3/1986 | Berti | |
| 4,708,040 | A | 11/1987 | Erickson | |
| 4,715,753 | A | 12/1987 | Tack | |
| 4,726,268 | A | 2/1988 | Erickson | |
| 4,736,659 | A | 4/1988 | Erickson | |
| 4,748,879 | A | 6/1988 | Von Haas | |
| 4,829,862 | A | 5/1989 | Keritsis | |
| 4,913,607 | A | 4/1990 | von Haas | |
| 4,945,793 | A | 8/1990 | Von Haas | |
| 4,981,057 | A | 1/1991 | Von Haas et al. | |
| 5,040,932 | A | 8/1991 | Oshnock | |
| 5,137,401 | A | * 8/1992 | Muendlein et al. ...... | 403/374.3 |
| 5,263,351 | A | * 11/1993 | Berg, III .................. | 403/374.3 |
| 5,341,710 | A | 8/1994 | Peuterbaugh | |
| 5,378,076 | A | * 1/1995 | D'Andrea ................ | 403/379.4 |
| 5,851,091 | A | 12/1998 | Klement | |
| 5,873,682 | A | 2/1999 | Tripsa | |
| 5,938,377 | A | 8/1999 | Jordberg et al. | |
| 6,109,152 | A | * 8/2000 | Hecht .......................... | 82/160 |
| 2001/0002231 | A1 | * 5/2001 | Erickson et al. ............ | 407/101 |

FOREIGN PATENT DOCUMENTS

| | | |
|---|---|---|
| DE | 3616230 A | 11/1987 |
| GB | 2164276 A | 3/1986 |
| WO | 9422623 A1 | 10/1994 |
| WO | WO00/37203 A1 * | 6/2000 |

OTHER PUBLICATIONS

International Search Report mailed Dec. 21, 2000 in counterpart PCT Application No. PCT/US00/23190.

* cited by examiner

Primary Examiner—A. L. Wellington
Assistant Examiner—Erica E. Cadugan
(74) Attorney, Agent, or Firm—Larry R. Meenan

(57) ABSTRACT

An apparatus is disclosed for releasably holding a toolholder shank having a lockable surface and a releasable surface utilizing an actuating bolt with an associated threaded actuating nut. When the actuating bolt is rotated in a locking direction, the actuating nut is drawn onto the bolt thereby clamping against the lockable surfaces of the toolholder shank. When the actuating bolt is rotated in the releasing direction, a releasing segment acts upon the toolholder thereby ejecting it from the tool support member.

18 Claims, 12 Drawing Sheets

TOOLHOLDER ASSEMBLY

CROSS-REFERENCE TO RELATED APPLICATION

This application is a continuation of copending U.S. application Ser. No. 09/388,259, filed Sep. 1, 1999, which is hereby incorporated herein by reference.

FIELD OF THE INVENTION

The invention is directed to tooling for machining operations and, more particularly, directed to a toolholder and an apparatus for holding the toolholder secure within a tool support member during machining operations.

BACKGROUND OF THE INVENTION

Minimizing the downtime of a machine tool in a production environment is critical to the success of a manufacturing facility. Historically, one major contributor to such downtime was the time needed to change damaged or worn out cutting tools used by the machine tool. A cutting tool is held by a toolholder, which is typically mounted within a tool support member secured to a machine tool. When the cutting tool must be replaced, the entire toolholder with the cutting tool is removed from the spindle. A number of commercial couplings permit quick connecting and disconnecting of the toolholder to and from the spindle to expedite the tool changing process. One such device is described in U.S. Pat. No. 4,736,659 entitled "Apparatus for Holding a Toolholder Shank." This patent is co-owned by the Assignee of the present application and is hereby incorporated by reference. The apparatus described in that patent utilizes two locking balls which are urged radially outwardly within a tool support member to engage apertures on the shank of a toolholder. While this arrangement is efficient and permits the toolholder to be removed or secured to a tool support member in a short amount of time, the design of this arrangement may limit its application to toolholders having a width of one inch or greater. Since many industrial applications require the use of a cutting tool which must be mounted on a much smaller toolholder, a need exists for a quick change toolholder system for toolholders which may be designed having a width of less than one inch.

Such a system must not only have a compact design, but furthermore, provide quick connecting and disconnecting of the toolholder from the toolholder support member in an efficient manner that makes it practical for use by a machine tool operator.

The system described hereinafter is a quick change tooling system by which a toolholder is secured with a tool support member utilizing simple hardware that permits the size of the toolholder and toolholder support member to be significantly reduced over other commercially available quick change tool systems.

SUMMARY OF THE INVENTION

One embodiment of the invention is directed to an apparatus for releasably holding a toolholder with a shank having lockable surfaces and a releasable surface. The apparatus comprises a tool support member having a forwardly facing surface and a bore along a longitudinal axis, wherein the bore intersects the forwardly facing surface and extends rearwardly therefrom for receiving the shank of the toolholder. The apparatus further comprises an actuating bolt positioned within the tool support member along a radial axis R1 relative to the longitudinal axis and having a first end with a bolt locking segment having a bolt locking surface and an actuating nut rotatably fixed within the tool support member, wherein the actuating nut is threadably secured to a second end of the actuating bolt and has a nut locking segment with a nut locking surface. Rotation of the actuating bolt in a locking direction causes the actuating nut to be drawn to the bolt first end thereby drawing together the nut locking surface and the bolt locking surface to engage the toolholder lockable surfaces and to lock the toolholder within the tool support member. A second embodiment of the subject invention is directed toward a toolholder for mounting in a bore of a tool support member with a longitudinal axis and a forwardly facing surface and for being secured rearwardly along the axis within the bore by an actuating bolt with a threadably secured nut secured thereto and movable in a relative motion along an R1 axis radial to the longitudinal axis, wherein the bolt and the nut each have a locking segment with a locking surface and wherein the bolt additionally has a releasing segment with a releasing surface. The toolholder is comprised of a forward end upon which a cutting tool may be mounted and a shank adjacent to and connected to a rearwardly facing abutment face and extending rearwardly from the forward end. The shank has a releasable segment with a releasable surface engageable by the bolt releasing surface and has a pair of lockable segments with lockable surfaces defined by perforations at circumferentially spaced locations and engageable by the bolt and nut locking surfaces. Each of the lockable surfaces is urged rearwardly by one of each of the locking surfaces when the actuating bolt is rotated in a locking direction. The releasable surface is urged forwardly by the releasing surface of the actuating bolt when the actuating bolt is rotated in a releasing direction.

A third embodiment of the subject invention is directed toward a combination for mounting a toolholder into a bore in a forwardly facing surface of a tool support member. The combination is comprised of a tool support member and a toolholder. The tool support member has (i) a forwardly facing surface and a bore along a longitudinal axis, wherein the bore intersects the forwardly facing surface and extends rearwardly therefrom for receiving the shank of the toolholder, (ii) an actuating bolt positioned within the tool support member along a radial axis R1 relative to the longitudinal axis and having a first end with a bolt locking segment having a bolt locking surface, and (iii) an actuating nut rotatably fixed within the tool support member, threadably secured to a second end of the actuating bolt and having a nut locking segment having a nut locking surface. The toolholder has a forward end upon which a cutting tool may be mounted and has a shank adjacent to and connected to a rearwardly facing abutment face and extending rearwardly from the forward end. The shank has (i) a releasable segment with a releasable surface engageable by the bolt releasing surface and (ii) a pair of lockable segments with lockable surfaces defined by perforations at circumferentially spaced locations and engageable by the bolt and nut locking surfaces. Each of the lockable surfaces is urged rearwardly by one of each of the locking surfaces when the actuating bolt is rotated in a locking direction. Furthermore, the releasable surface is urged forwardly by the releasing surface of the actuating bolt when the actuating bolt is rotated in a releasing direction.

BRIEF DESCRIPTION OF THE DRAWINGS

The above, as well as other features and advantages of the invention will become apparent upon consideration of the detailed description in connection with the several drawings in which.

DESCRIPTION OF THE PREFERRED EMBODIMENT

Figure 1:
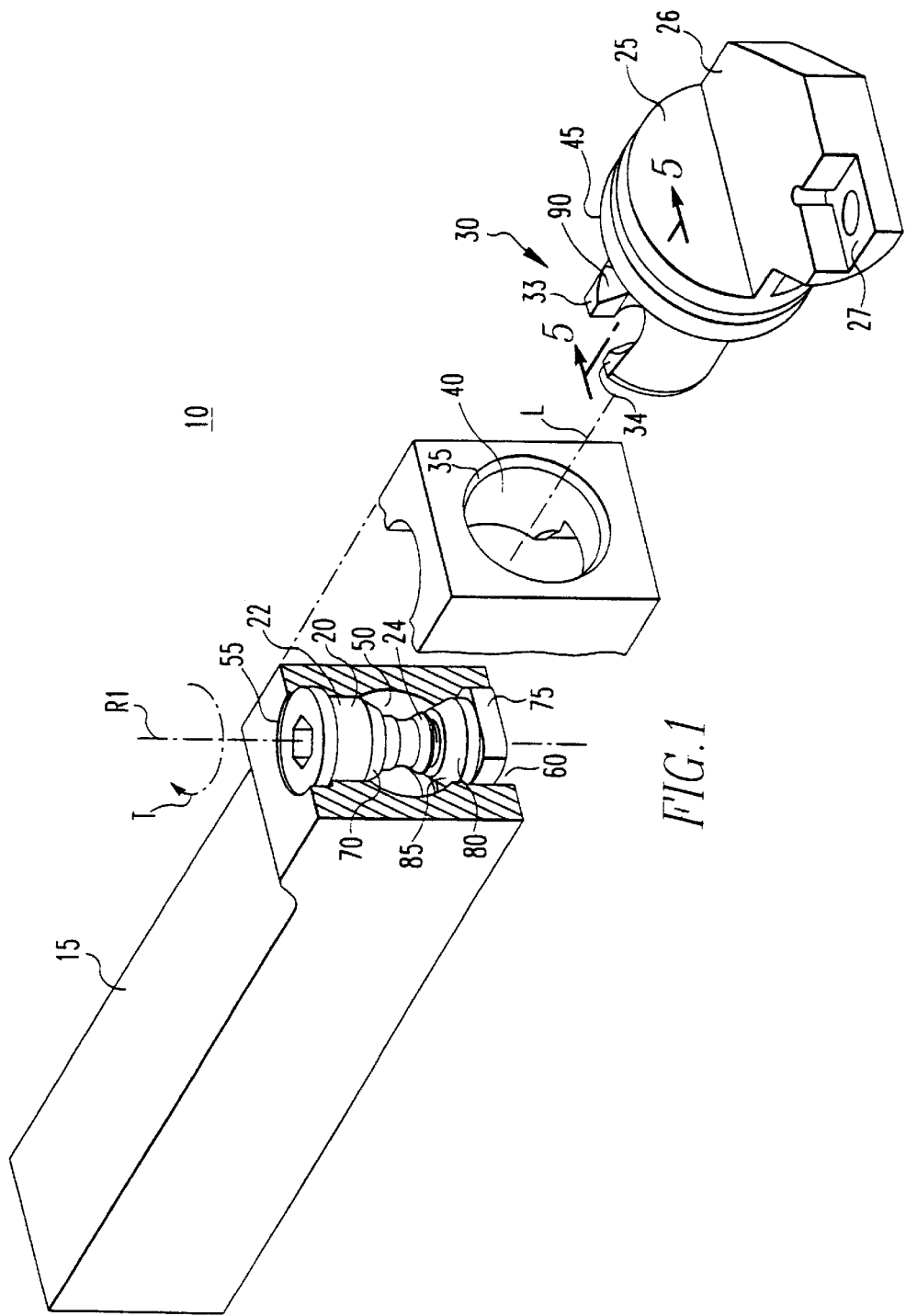
FIG. 1 is a perspective view of a toolholder assembly in accordance with the present invention.
Figure 2:
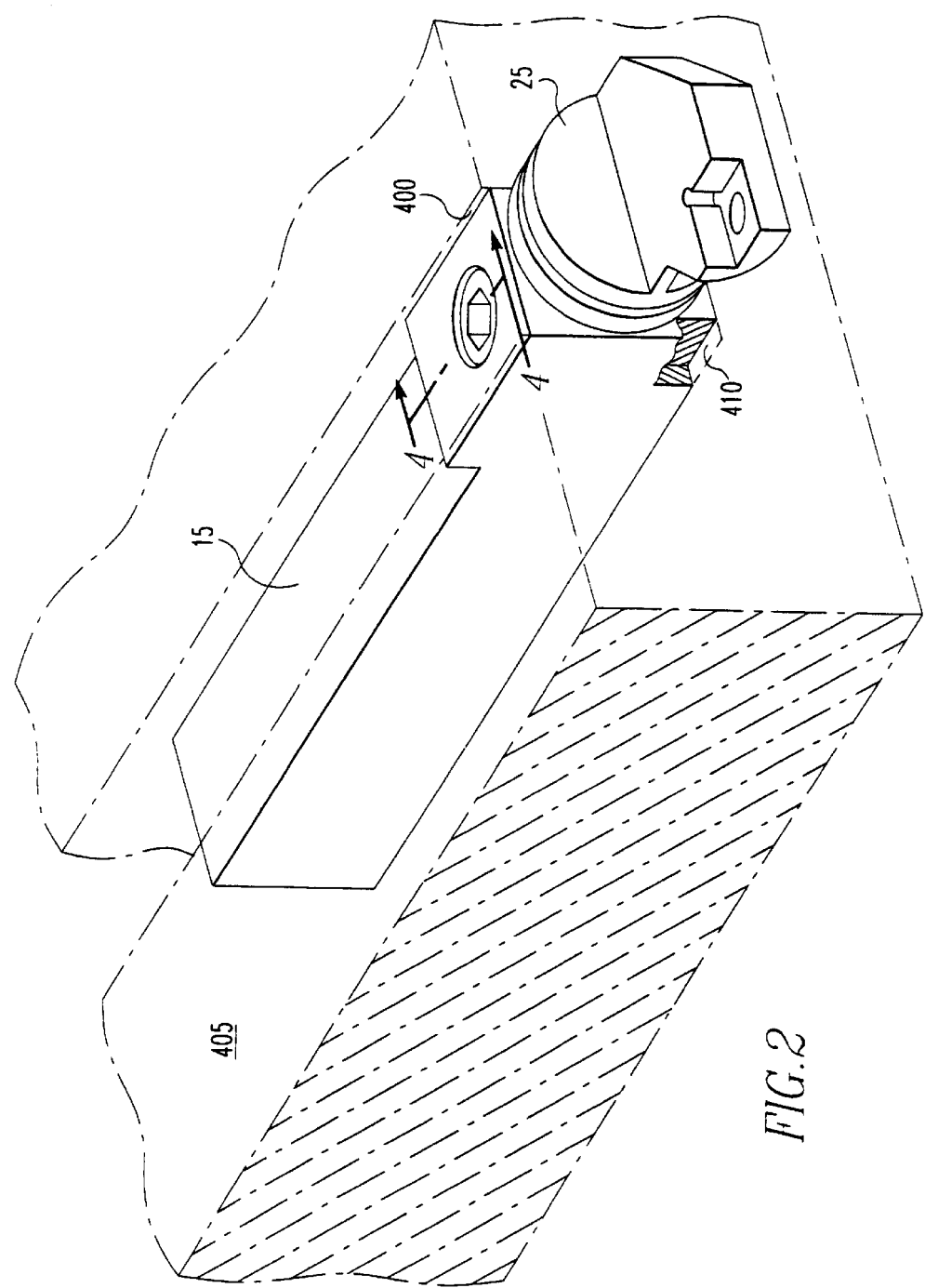
FIG. 2 is an assembled perspective view of a toolholder assembly in accordance with the present invention mounted within a slot on a machine tool.

FIGS. 1 and 2 illustrate perspective views of the subject invention in an exploded arrangement and an assembled arrangement respectively, in general, the apparatus 10 is made up of a tool support member 15, an actuating bolt 20 and a toolholder 25 having a shank 30, which may be tubular with a conical shape. However, the subject invention is directed at securing the shank 30 within the bore 40 of the tool support member 15 and, therefore, the shank 30 and the bore 40 may be any number of different shapes, including cylindrical, square, rectangular, triangular and trochoidal, sufficient to accommodate the actuating bolt 20 described herein. Furthermore, the shank 30 may have an interference fit within the bore 40.

The toolholder 25 may have a support portion 26 with a pocket 27 for receiving a cutting insert (not shown) therein. However, the toolholder 25 is presented for illustrative purposes only and, as will be discussed, the shank 30 of the subject invention may be used with any of a variety of configurations attached to the shank. Therefore, the term "toolholder" used herein should encompass any configurations secured to the tool support member 15 through the shank 30.

The tool support member 15 has a forwardly facing surface 35 and a bore 40 along a longitudinal axis L. The surface 35 may be mateable with an opposing rearward abutment surface 45 on the toolholder 25 and these surfaces may be, among other shapes, conical or planar, to matingly contact one another. The bore 40 extends rearwardly from the forwardly facing surface 35 for receiving the tubular toolholder shank 30 of the toolholder 25.

The actuating bolt 20 is positioned in the tool support member 15 along a radial axis R1, which is radial to the longitudinal axis L, for locking the toolholder 25 into the tool support member 15 or for ejecting the toolholder 25 from the tool support member 15. The actuating bolt 20 is positioned within a passageway 50 extending through the tool support member 15 along axis R1, thereby defining a first aperture 55 and a second aperture 60 within the tool support member 15 wherein the second aperture 60 is directly opposed to the first aperture 55.

FIG. 2 illustrates the toolholder 25 secured within the tool support member 15. As will be later discussed, the toolholder support member 15 may be secured within a slot 400 on a machine tool 405.

Figure 3:
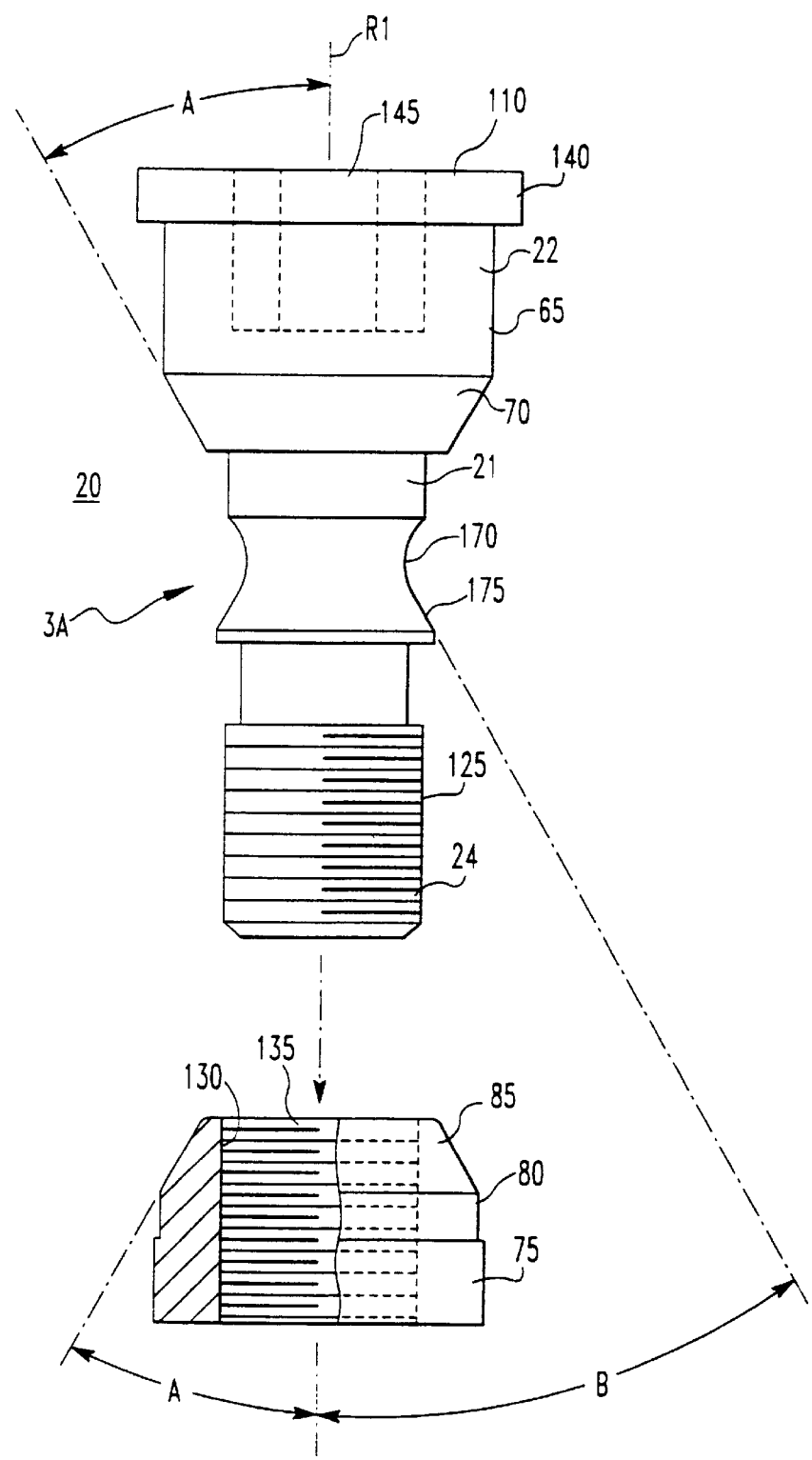
FIG. 3 is a side view of the actuating bolt and actuating nut.

As illustrated in FIG. 3, the actuating bolt 20 has a first end 22 and a second end 24. At the first end 22 is a bolt locking segment 65 having a bolt locking surface 70. An actuating nut 75 is rotatably fixed within the tool support member 15 and threadably secured to the second end 24 of the actuating bolt 20. The actuating nut 75 has a nut locking segment 80 with a nut locking surface 85. Rotation of the actuating bolt 20 in a locking direction, indicated for example by arrow T in FIG. 1, causes the actuating nut 75 to be drawn toward the bolt first end 22 thereby drawing together the nut locking surface 85 and the bolt locking surface 70 to engage lockable surfaces on the toolholder. The second end 24 of the actuating bolt 20 has threads 125 which matingly engage threads 130 on the inner wall of a bore 135 extending through the actuating nut 75. The actuating bolt 20 has an actuating bolt head 140 with a cavity 145, which may be hexagonal, extending therein to accept a tool for rotating the actuating bolt 20. In the alternative, any configuration which would accept a tool for rotating the actuating bolt 20 would be acceptable and such configurations are well known to those skilled in the art of designing fasteners. Furthermore, instead of rotating the bolt, the bolt may be rotationally fixed and the actuating nut may be rotated using a suitable nut designed to permit such rotation.

Figure 4:
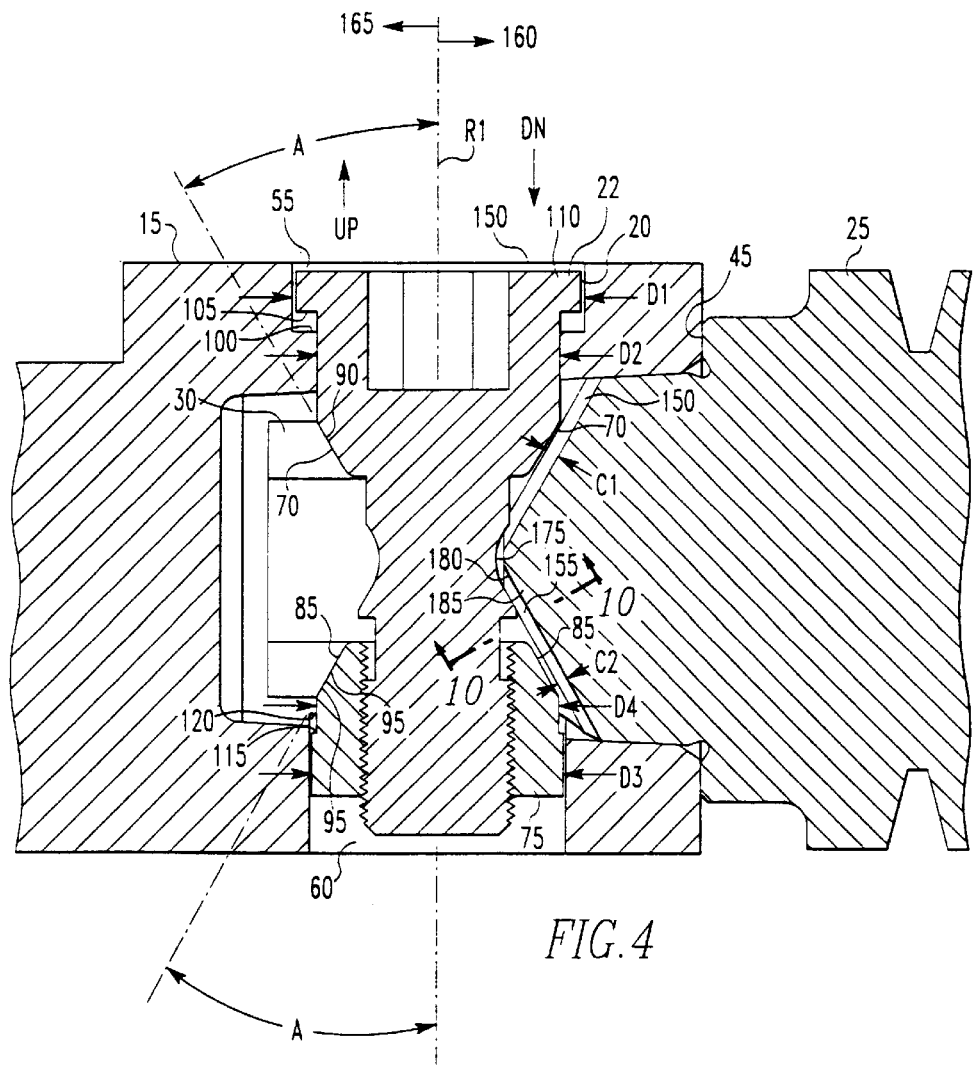
FIG. 4 is a section view along arrows "4—4" in FIG. 2 illustrating the apparatus in the locked position.

FIG. 4 illustrates the actuating bolt 20 and the actuating nut 75 in a locked position to secure the toolholder 25 within the tool support member 15. The first aperture 55 and the second aperture 60 of the support member 15 provide lateral support to the actuating bolt 20 and actuating nut 75, respectively, and allow limited movement of the actuating nut 75 and actuating bolt 20 along the radial axis R1. It should be noted that neither the actuating bolt 20 nor the actuating nut 75 are threadably secured to the first aperture 55 or the second aperture 60 of the tool support member 15. Because of this, when the shank 30 of the toolholder 25 is removed from the tool support member 15, which may occur when the apparatus is in the unlocked state, then the actuating bolt 20 and the actuating nut 75 are free to move along the radial axis R1. By permitting this movement, when the toolholder 25 is positioned within the tool support member 15 and the actuating bolt 20 is rotated in the locking direction, the actuating nut 75 is drawn toward the first end 22 of the actuating bolt 20 and lockable surfaces 90, 95 of the shank 30 are engaged with equal forces.

Since the bolt 20 and the nut 75 are free to slide in the apertures 55, 60 when the toolholder 25 is not inserted in the tool support member 15 then, as a practical matter, the bolt 20 should be prevented from sliding out from the tool support member 15. As illustrated in FIG. 4, the first aperture 55 has a first aperture flange diameter D1 and a smaller first aperture bolt diameter D2 to define a shoulder 100 which engages the shoulder 105 of a flange 110 on the first end 22 of the actuating bolt 20 thereby limiting the downward movement indicated by arrow DN along axis R1 of the actuating bolt 20 and the actuating nut 65. In a similar fashion, the second aperture 60 has a second aperture nut width D3 and a width D4 which define a shoulder 115 to engage a corresponding shoulder 120 of the actuating nut 75 thereby limiting the upward movement indicated by arrow UP along axis R1 of the actuating bolt 20 and the actuating nut 75.

To advance the actuating nut 75 upon the actuating bolt 20 it is necessary when the actuating bolt 20 is rotated to rotationally restrain the actuating nut 75. In accordance with one embodiment, as illustrated in FIG. 1, the actuating nut 75 may have a square shape. Additionally, the nut 75 may have any other non-circular shape or other polygonal shape. The second aperture 60 provides a cavity which conforms to the shape of the actuating nut 75 thereby rotationally fixing the actuating nut 75 within the second aperture 60. In this manner, when the actuating bolt 20 is rotated, the rotationally fixed actuating nut 75 will only move linearly only along the radial axis R1.

Figure 5:
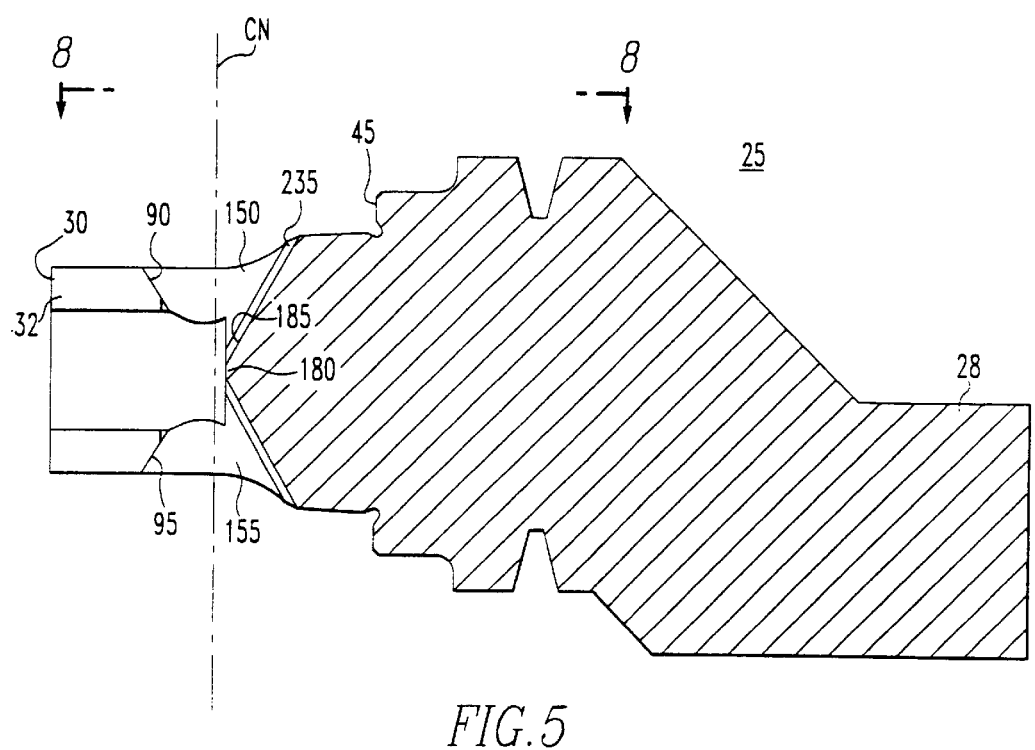
FIG. 5 is section view of the toolholder shank taken along arrows "5—5" in FIG. 1.

FIG. 5 illustrates a cross sectional view of the toolholder 25 and will be used in conjunction with FIG. 4 to highlight features of the shank 30. The shank 30 is adjacent to and connected to the rearwardly facing abutment surface 45 and extends rearwardly from the toolholder forward end 28 upon which a cutting tool or other configuration may be mounted. The shank 30, as previously discussed has a first toolholder lockable surface 90 and a second toolholder lockable surface 95. These surfaces are defined by perforations 150, 155 at circumferentially spaced locations extending through the wall 32 of the shank.

Returning to FIG. 4, which shows the apparatus in the locked position, when the actuating bolt 20 is tightened, the locking surface 70 of the actuating bolt 20 is urged against the fist toolholder lockable surface 90 and the locking surface 85 of the actuating nut 75 is urged against the second toolholder lockable surface 95 to urge the shank 30 within the tool support member 15.

For convenience, reference will be made to a forward half 160 and a rearward half 165 of the actuating bolt 20, as illustrated in FIG. 4.

All of the forces imposed by the actuating bolt 20 and the actuating nut 75 upon the shank 30 during the locking operation are applied rearwardly of radial axis R1. At the forward half 160 of the actuating bolt 20, there is a clearance C1 between the locking surface 70 of the actuating bolt 20 and the perforation 150 and, furthermore, there is a clearance C2 between the locking surface 85 of the actuating nut 75 and the perforation 155. In this manner, the forces opposed by the actuating bolt 20 and the actuating nut 75 in the locked position urge the shank 30 toward the rearward half 165 of the actuating bolt 20.

Briefly returning to FIG. 3, the actuating bolt 20 further includes a releasing segment 170 with a releasing surface 175 for abutting and urging forwardly a releasable surface 185 (FIG. 4) of the shank 30 to eject the toolholder shank 30 from the support member 15. The releasing segment 170 is disposed between the first end 22 and the second end 24 of the actuating bolt 20. The releasing surface 175 may be a recess within the shank 21 of the bolt 20 and that recess may be concave. Furthermore, the releasing surface 175 may have a generally conical shape.

Figure 3A:
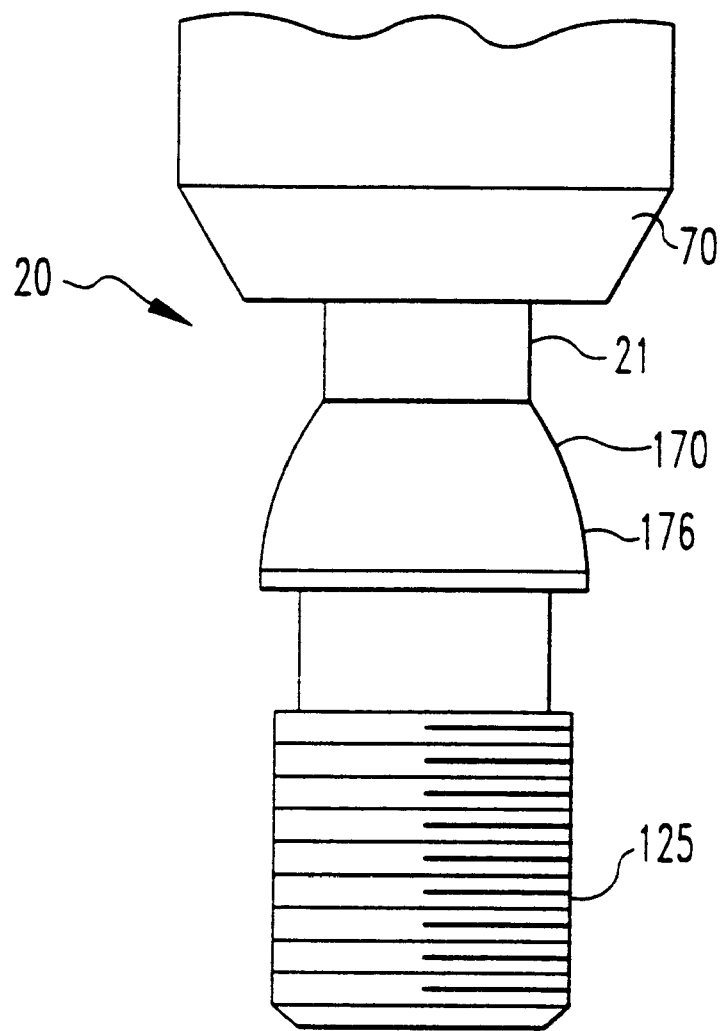
FIG. 3A is a modification of the segment indicated by arrow 3A in FIG. 3.

As illustrated in FIG. 3A, which shows a portion 3A highlighted in FIG. 3 but modified, it should be appreciated that the releasing segment 170 may have a releasing surface 176 which projects from the shank 21 of the actuating bolt 20 to provide a protruding surface which may be convex. Such a convex surface may act against a linear surface on the toolholder to provide a point contact. While it is preferred to have contact between the releasable surface 185 of the toolholder 25 and the releasing surface 176 of the bolt 20 along a line, it is possible to have a point contact or area contact and arrangements providing such contact are within the scope of the subject invention.

Figure 6:
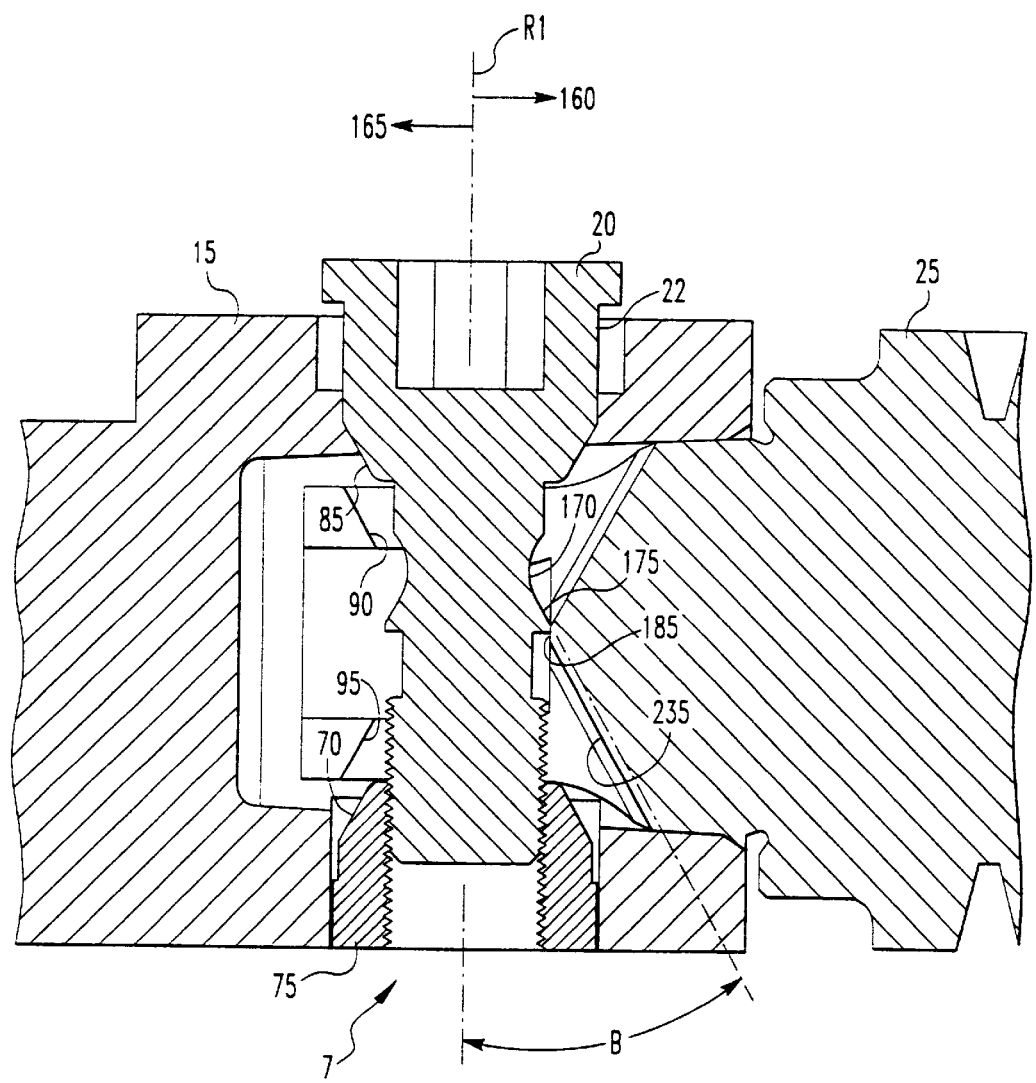
FIG. 6 is a section view similar to that in FIG. 4, however, showing the arrangement with the actuating bolt in the raised unlocked position to expel the toolholder from the tool support member.

It should be noted in FIG. 4, when the apparatus is in the locked position, the releasing surface 175 is positioned adjacent to a protruding segment 180 of the toolholder 25. The protruding segment 180 has a releasable surface 185. However, there is no contact between these two parts. As illustrated in FIG. 6, where the apparatus is in the unlocked position, after the actuating bolt 20 has been rotated in the unlocking direction, the actuating nut 75 moves away from the first end 22 of the actuating bolt 20 until the locking surfaces 70, 85 on the actuating nut 75 and the actuating bolt 20, respectively, clear the first toolholder lockable surface 90 and the second toolholder lockable surface 95 of the shank 30. As a result, the shank 30 is no longer restrained by the actuating bolt 20 and actuating nut 75.

To promote the removal of the toolholder 15 from the tool support member 15, the toolholder shank 30, as best illustrated in FIG. 1, has a pair of flat surfaces 33, 34 on the top of the shank 30 and a similar pair of flat surfaces (not shown) on the bottom of the shank 30. These flats provide clearance and allow less distance between the bolt 20 and the nut 75 for removal of the toolholder 25 from the tool support member 15. This also allows for a more compact design since the bolt 20 and nut 75 may operate with a smaller distance between them.

It is not uncommon for the shank 30 of the toolholder 25 to remain frictionally engaged within the tool support member 15 even after the positive locking provided by the actuating bolt 20 and actuating nut 75 has been relieved. Under such circumstances, it is necessary to positively displace the toolholder 25 toward the forward half 160 of the actuating bolt 20 to release the toolholder 25 from the tool support member 15.

As illustrated in FIG. 6, when the actuating bolt 20 is rotated sufficiently, the releasing surface 175 of the actuating bolt 20 engages the releasable surface 185 of the toolholder 25 to positively displace the toolholder 25 toward the forward half 160 of the actuating bolt 20. After such displacement, the toolholder 25 is sufficiently loose within the tool support member 15 that it may be manually removed from the tool support member 15.

As previously mentioned, the actuating bolt 20 and the actuating nut 75 are not axially restrained by the tool support member 15 along the radial axis R1. Therefore, it is necessary to axially restrain the actuating nut 75 so that the actuating bolt 20 may move upwardly and force the toolholder 25 from the tool support member 15. There are different mechanisms available to perform this task.

First of all, as illustrated in FIG. 2, it is common for such a tool support member 15, to be mounted within the slot 400 (in phantom) on a machine tool 405 (in phantom). The tool support member 15 is secured within the slot 400 using any of a number of conventional techniques known to those skilled in the art of machining. When the tool support member 15 is mounted with such a slot 400, the actuating nut is physically blocked by the bottom surface 410 of the slot 400 thereby preventing axial motion of the actuating nut (not shown) beyond the boundary of the tool support member 15.

Figure 7:
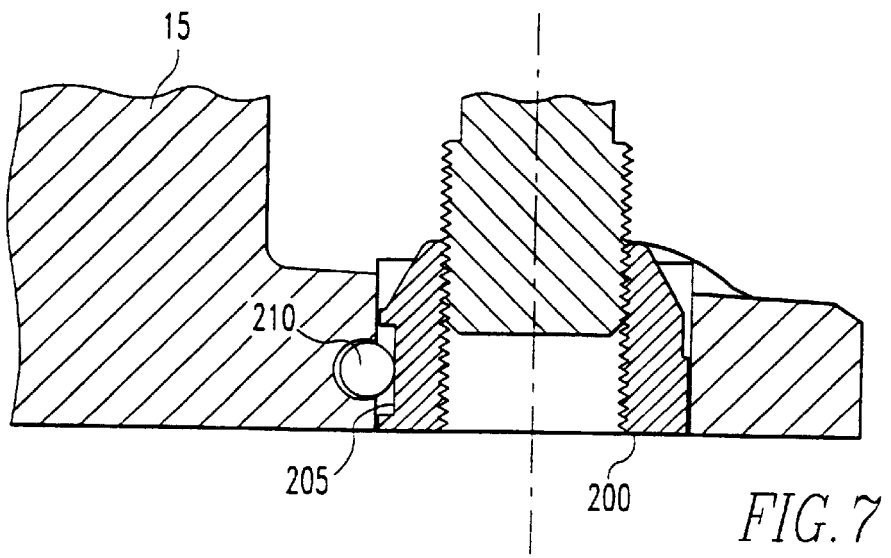
FIG. 7 illustrates a modified portion of the section indicated by arrow 7 in FIG. 6.

In the alternative, as illustrated in FIG. 7 which is a portion of the tool support member 15 highlighted by arrow 7 in FIG. 6 with certain details modified, it is entirely possible to provide an actuating nut 200 having a slotted recess 205 on one side which is engaged by a restraining pin 210 which extends into the tool support member 15 and engages the side of the recess 205 to limit the axial travel of the actuating nut 200.

The actuating nut 200 may be non-circular such that it is rotationally restrained when put into a mating aperture in the tool support member 15. Utilizing a pin 210 similar to that illustrated in FIG. 7 would permit limited axial movement and the actuating nut 200 could have a cylindrical configuration. Therefore, the pin 210 may perform a dual function of limiting the axial travel of the actuating nut and simultaneously limiting the rotation of the actuating nut 200.

Figure 8:
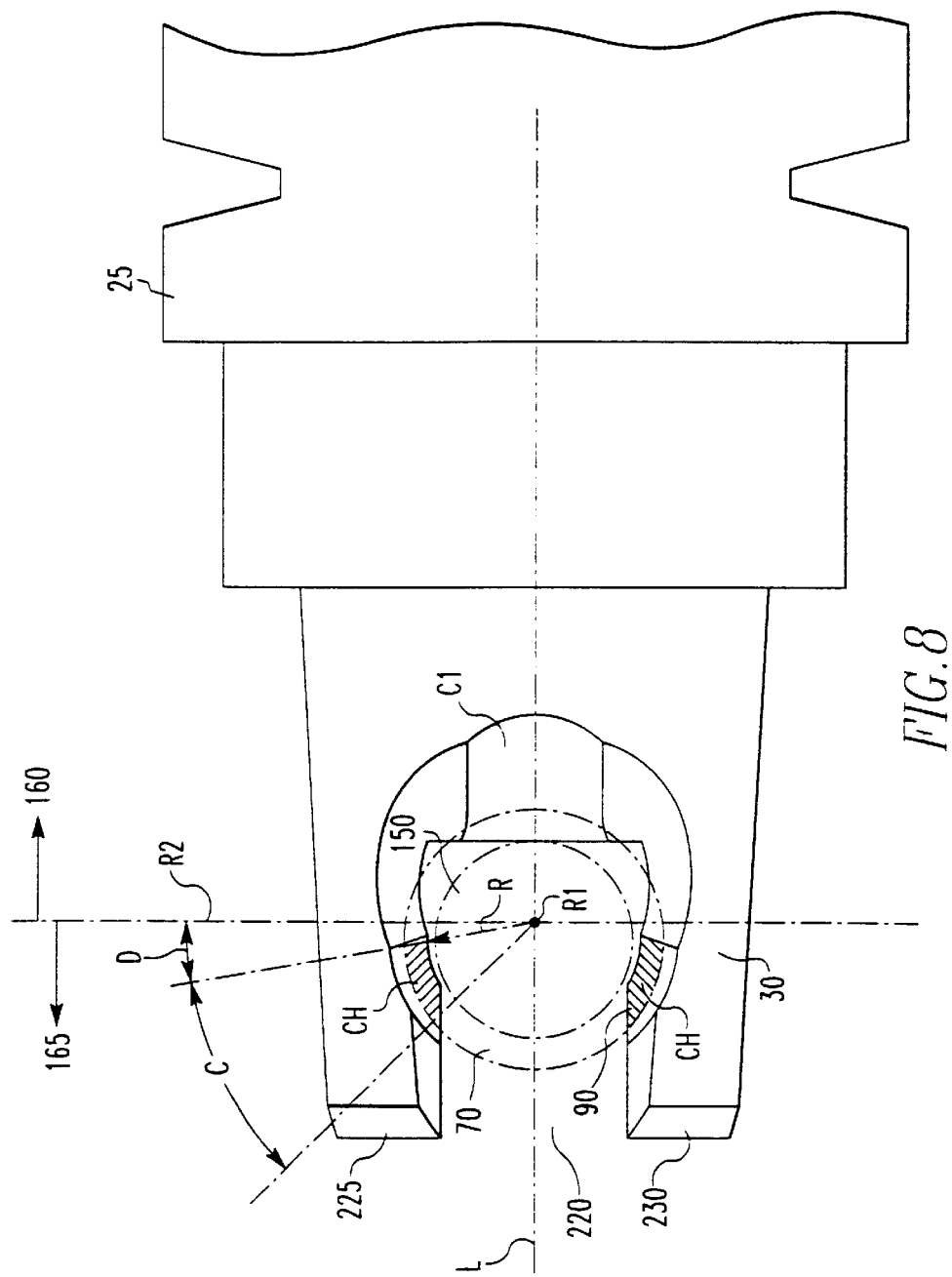
FIG. 8 is a top view of the toolholder shank taken along arrows "8—8" in FIG. 5.

FIG. 8 illustrates a top view of the shank 30 along arrows "8—8" in FIG. 5. For illustrative purposes, the radial axis R1 extends out of the page and is illustrated as a point within the perforation 150. A third axis R2 is perpendicular to the radial axis R1 and to the longitudinal axis L. The locking surface 70 of the actuating bolt 20 is shown in phantom. The locking surface 70 engages the first toolholder lockable surface 90 of the shank 30 as shown by cross hatching CH. The engaged portion of the lockable surface 90 contacts locking surface 70 of the actuating bolt 20 from a location rearwardly of the radial axis R2 to define a contact surface which forms an angle C of between 5 degrees and 80 degrees wherein the preferred angle is between 50 degrees and 60 degrees. As illustrated in FIG. 8, this contact surface is preferably angled slightly rearward of the R2 axis by an angle D, which may have a value between 1 degree and 30 degrees.

While what has just been illustrated are details of the first toolholder lockable surface 90 as it is engaged by the actuating bolt 20, it should be appreciated the second toolholder lockable surface 95 (FIG. 4) is identical and the nut locking surface 85 will contact the second toolholder locking surface 95 in the same fashion and along the same angle.

A slot 220 extends rearwardly from the perforation 150 and completely through the shank 30 to permit the shank 30 to be inserted around the actuating bolt 20 and the actuating nut 75 within the tool support member 15. Furthermore, the slot 220 may permit side 225 and side 230 of the shank 30 to expand radially outward along axis R2 at the same time the shank 30 is urged in the rearward direction while the toolholder 25 is being locked within the tool support member 15. This expansion may be useful when the sides 225, 230 of the shank 30 must expand outwardly to contact the bore 40 (FIG. 1) of the tool support member 15. However, when the shank 30 fits into the bore 40 of the tool support member 15 with an interference fit, such expansion may not be necessary.

An identical slot to that of slot 220 exists on the opposite side of the shank 30 and the same discussion presented for slot 220 applies to that slot.

The width of slot 220 and the opposing slot on the shank 30 may be modified in conjunction with the width of the actuating bolt 20 and the width of actuating nut 75 to permit the toolholder 25 to be mounted within the tool support member 15 in only one orientation.

When the shank 30 fits within the bore 40 with an interference fit, the amount of radial interference should be between 0.0002–0.0010 inches and preferably between 0.004–0.008 inches.

Since the actuating bolt 20 is rotated for locking, the locking surface 70 of the actuating bolt 20 extends around the periphery of the bolt 20. Therefore, the locking surface 70 forms a cone having a centerline about the bolt axis R1.

On the other hand, since the actuating nut 75 does not rotate, only a portion of the perimeter of the actuating bolt 20 must have a locking surface 85. However, for convenience and to prevent improper positioning of the nut 75, the locking surface 85 may extend around the perimeter of the bolt 20.

The locking surfaces 70 and 85 are generally conical in shape and have a common centerline along axis R1. This permits the locking surface 70 to fully engage the first toolholder lockable surface 90 of the shank 30, which has a matching conical shape. Such an arrangement will permit relatively high forces between the locking surface and the first toolholder lockable surface 90 since the generated force will be distributed over the contact area between the two surfaces. This same concept applies to the second toolholder lockable surface 95 as with respect to the locking wedge surface 85.

In the locked position, the centerlines of the locking surfaces 70, 85 of the bolt 20 and nut 75 are coaxial with the centerline CN of the first and second toolholder lockable surfaces 90, 95. Since each of these surfaces are defined by a mating cone, this provides radial alignment of the shank 30 within the tool support member 15 about the longitudinal axis L.

Such radial adjustment may also be accomplished through the use of a cone on the actuating bolt and a planar wedge surface on the actuating nut, which does not have a cone shape, but which conforms with a mating surface on the associated lockable surface of the shank.

Figure 9:
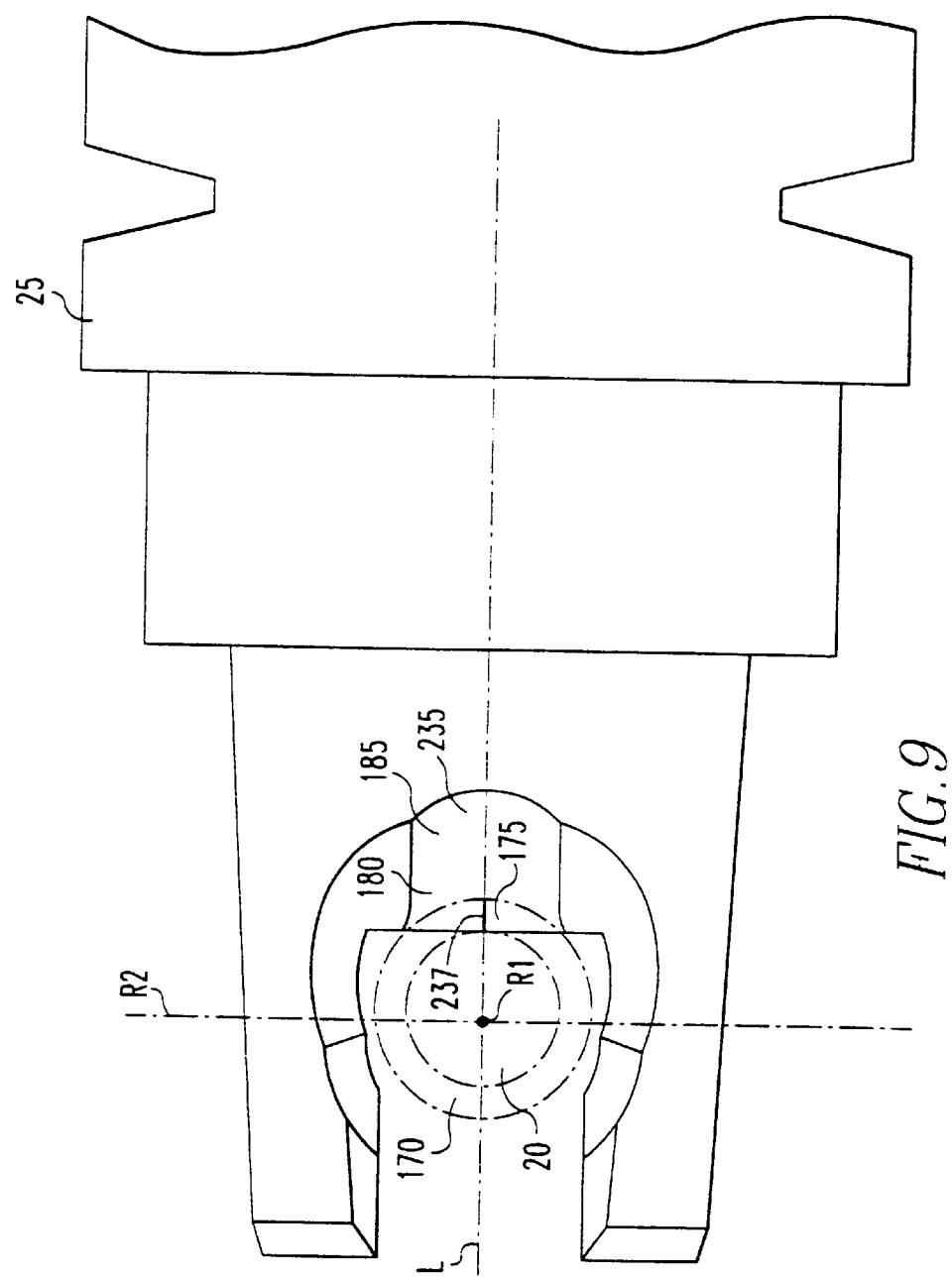
FIG. 9 is a view of the toolholder shank similar to FIG. 8 but modified to show different features.

FIG. 9 illustrates a toolholder 25 identical to that illustrated in FIG. 8 but will be used to discuss the toolholder releasing feature of the subject apparatus. Just as with FIG. 8, the radial axis R1 has been indicated as a point and a third axis labeled R2 has been extended in a direction perpendicular to the radial axis R1 and to the longitudinal axis L. The releasing surface 175 of the releasing segment 170 of the actuating bolt 20 are illustrated in phantom.

Directing attention to FIG. 5, the releasable surface 185 of the protruding section 180 on the toolholder 25 is comprised of a channel 235 which may have a constant radius extending through the wall 32 of the shank 30 and located forward of axis CN.

Figure 10:
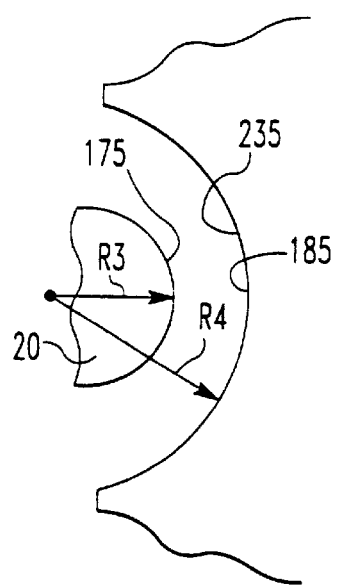
FIG. 10 is a section view taken along arrow "10—10" in FIG. 4.

The channel 235 and the releasable surface 185 with its relation to a releasing wedge 175 of the actuating bolt 20 is further illustrated in FIG. 10 which is a cross section view along lines 10–10" of FIG. 4. It should be noted, however, that FIG. 10 illustrates these surfaces separated from one another. It should be clear that the outer radius R3 of the releasing segment 175 is smaller than the radius R4 of the releasable surface 185 of the channel 235 such that when the actuating bolt 20 is tightened the actuating nut 75 will move up and the releasing segment 175 will move directly against the releasable surface 185 of the channel 235 thereby providing a line contact 237 against the channel 235 to eject the toolholder 25.

Directing attention to FIGS. 3 and 4, the locking surface 70 of the actuating bolt 20 forms an angle A with the radial axis R1. The range of the angle A may be between 10 to 60 degrees with a preferred angle of 30 degrees. The locking surface 85 of the actuating nut 75 forms a similar angle A with the radial axis R1. Likewise, the first toolholder lockable surface 90 and the second toolholder lockable surface 95, illustrated in FIG. 4, form the same angle A with the radial axis R1, which is coaxial with centerline CN (FIG. 5) the shank 30 is secured within the tool support member 15.

Directing attention to FIGS. 3 and 6, the releasable surface 175 of the releasing segment 170 forms an angle B with the radial axis R1. The angle may have a range of between 10 to 60 degrees and a preferred angle of 30 degrees. Additionally, the releasable surface 185 of the channel 235 on the toolholder 25 (FIG. 5) forms the same angle B with the radial axis R1.

Figure 11:
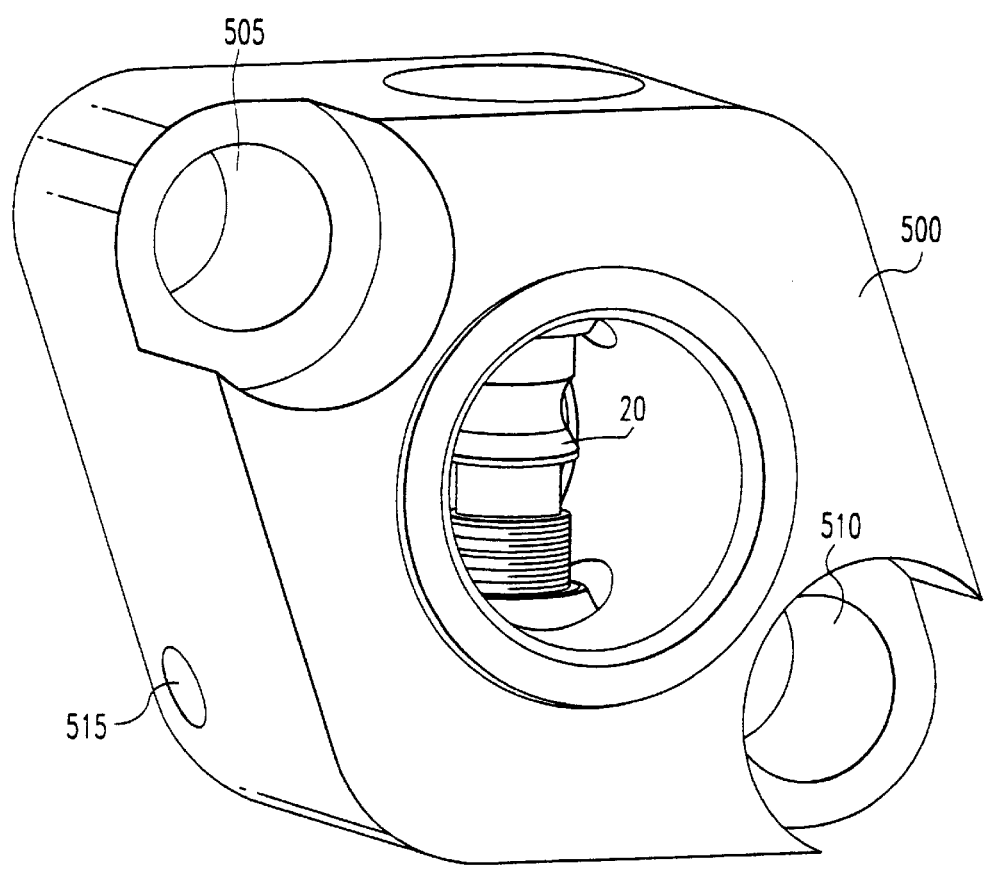
FIG. 11 is a block which may be mounted upon a machine tool and incorporates the subject invention.

The toolholder support member 15 so far discussed is a square shank member suitable for mounting in a slot on a machine tool, directing attention to FIG. 11, it should be appreciated, the design of the subject invention may, with minor modifications be incorporated into a block 500 utilizing the same actuating bolt 20 and actuating nut (not shown) as previously discussed. The block 500 may be mounted directly to the face of a machine tool spindle using bolts which would extend through mounting bolt holes 505, 510 and into the face. A toolholder 25 would be mounted in the block 500 in the same fashion as the toolholder 25 is mounted within tool support member 15 previously discussed. The pin arrangement illustrated in FIG. 7 would be used within bore 515 to restrain the actuating nut.

Figure 12:
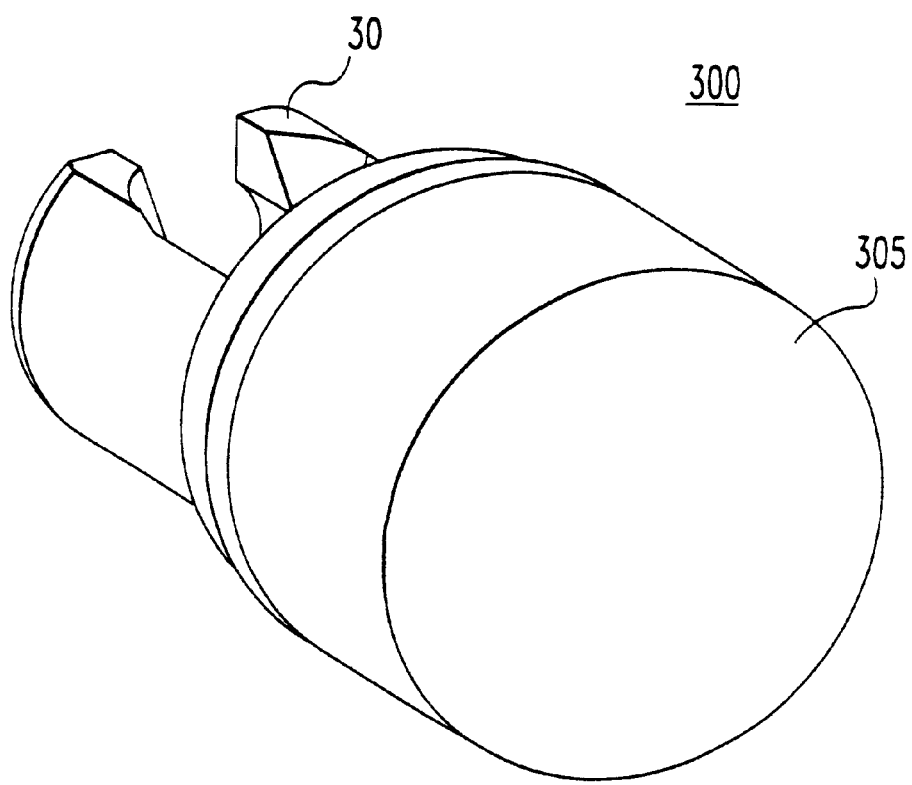
FIG. 12 is a perspective view of a toolholder blank which has not yet been machined for any particular use.

The toolholder 25 is illustrated in FIG. 1 with a pocket 27 to accept a cutting tool. FIG. 12 illustrates an item generally identified in the industry as a toolholder blank 300 in that the modular shank 30 is attached to a large mass 305 of unmachined material. It is common in the metalworking industry to begin with a blank of this sort and to machine the blank into any desirable configuration including an arrangement to accept a cutting tool as illustrated in FIG. 1.

However, the possibility for machining such a blank is unlimited and it is typical to machine such a blank to accept a stationary cutting tool, a rotating cutting tool, or to machine such a blank to act as a coupling for an extension piece or another toolholder. Therefore, it should be understood the subject invention is not limited to a toolholder on a shank but may be expanded to any device for metal working operations which utilize a shank 30 similar to that illustrated in FIG. 1.

While the shank 30 and the bore 40 of the associated tool support member 15 have been illustrated as tubular, the invention should not be limited to such a shape.

Although the actuating bolt 20 was used to eject the toolholder 25 from the tool support member 15, it should be appreciated with minor modifications the actuating nut 75 could, in the alternative, have a releasing segment 175 similar to that illustrated with actuating bolt 20.

Finally, although this apparatus is ideal for small tools, that should not be a limitation upon its use and it should be understood that this apparatus would be functional for use with a toolholder of any size or style.

It is thought the present invention and many of its intended advantages will be understood from the foregoing description and it will be apparent that various changes may be made in the form, construction and arrangement of the parts thereof without departing from the spirit or scope of the invention or sacrificing all of its material advantages, the form herein before described being merely preferred or exemplary embodiments thereof.

What is claimed is:

1. An apparatus for releasably holding a shank of a toolholder, the apparatus comprising:
   (a) a tool support member having a bore for receiving the shank of the toolbolder,
   (b) a rotatable actuating bolt positioned within the too support member having a first end with a bolt locking segment having a bolt locking surface;
   (c) an actuating nut rotatably fixed within the tool support member and secured to a second end of the actuating bolt and having a nut locking segment having a nut locking surface; and
   (d) wherein rotation of the actuating bolt in a locking direction causes the actuating nut to be drawn to the bolt first end thereby drawing together the nut locking surface and the bolt locking surface to engage the toolholder and to lock the toolholder within the tool support member;
   wherein the actuating bolt further includes a releasing segment having a releasing surface for abutting and urging the toolholder shank from the tool support member, wherein the releasing segment is disposed between the first end and the second end of the actuating bolt and wherein the actuating bolt has a shank and the releasing surface is either recessed within the actuating bolt shank or protrudes from the actuating bolt shank.

2. The apparatus according to claim 1 wherein the actuating bolt is positioned within a passageway which extends through the tool support member thereby defining a first aperture and a second aperture within the support member and directly opposed to one another.

3. The apparatus according to claim 2 wherein the first aperture and the second aperture provide lateral support to the actuating bolt and the actuating nut respectively and allow sliding movement of the nut and the bolt and permit the nut and the bolt to clamp the shank of the toolholder with equal forces.

4. The apparatus according to claim 3 wherein each locking surface has a conical shape.

5. The apparatus according to claim 4 wherein the conical shape of each locking surface has a centerline which is co-axial with an axis (R1) of the bolt.

6. The apparatus according to claim 1 wherein the first end of the actuating bolt has a head with a cavity compatible with a tool for rotating the actuating bolt.

7. The apparatus according to claim 1 wherein the releasing surface has a conical shape.

8. The apparatus according to claim 1 wherein the actuating nut has a polygonal shape and fits into a matching polygonal shape in the tool support member to rotationally restrain the nut.

9. The apparatus according to claim 8 wherein the polygonal shape is quadrilateral.

10. The apparatus according to claim 1 wherein the nut is circular in shape and has a groove extending therein and wherein a pin extends into the tool support member and engages the side of the groove to restrain rotation and axial movement of the nut.

11. An apparatus for releasably holding a shank of a toolholder, the apparatus comprising:
   (a) a tool support member having a bore for receiving the shank of the toolholder;
   (b) a rotatable actuating bolt positioned within the tool support member having a first end with a bolt locking segment having a bolt locking surface;
   (c) an actuating nut rotatably fixed with the tool support member and secured to a second end of the actuating bolt and having a nut locking segment having a nut locking surface; and
   (d) wherein rotation of the actuating bolt in a locking direction causes the actuating nut to be drawn to the bolt first end thereby drawing together the nut locking surface and the bolt locking surface to engage the toolholder and to lock the toolholder within the tool support member; wherein the actuating bolt further includes a releasing segment having a releasing surface for abutting and urging the releasable surface of the shank to eject the toolholder shank from the tool support member, and wherein the actuating nut is restrained within a passageway.

12. The apparatus according to claim 11 wherein a groove extends into a side of the nut and a pin extends through the tool support member to engage the groove and restrain the nut.

13. A combination for mounting a toolholder into a bore of a tool support member, said combination comprising:
 (a) a tool support member having:
  (i) a forwardly facing surface and a bore, wherein the bore intersects the forwardly facing surface and extends rearwardly therefrom for receiving the shank of the toolholder;
  (ii) an actuating bolt positioned within the tool support member and having a first end with a bolt locking segment having a bolt locking surface; and
  (iii) an actuating nut rotatably fixed within the tool support member, secured to a second end of the actuating bolt and having a nut locking segment having a nut locking surface; and
 (b) the toolholder having a forward end upon which a cutting tool may be mounted and a shank adjacent to and connected to a rearwardly facing abutment face and extending rearwardly away from the forward end, wherein the shank has:
  (i) a releasable segment with a releasable surface engageable by a bolt releasing surface; and
  (ii) a pair of lockable segments with lockable surfaces defined by perforations circumferentially spaced about the shank and engageable by the bolt and nut locking surfaces, wherein the pair of lockable surfaces of the toolholder have the shape of a cone with a common lockable cone centerline and wherein the lockable surfaces are located rearwardly of the cone centerline.

14. The combination according to claim 13 wherein the actuating bolt lies along an axis radial to a tool support member longitudinal axis and wherein the locking surface of the actuating bolt engages the lockable surfaces of the shank in a region rearward of the radial axis.

15. The combination according to claim 13 wherein the actuating bolt lies along an axis radial to a tool support member longitudinal axis and wherein the releasing surface of the actuating bolt engages the releasable surface of the shank in a region forward of the radial axis.

16. The combination according to claim 13 wherein the toolholder shank is conical and the bore of the tool support member is conformed to accommodate the shank.

17. The combination according to claim 13 wherein the locking surfaces of the actuating bolt and the actuating nut have the shape of a cone with a common locking cone centerline, wherein the lockable cone centerline is coaxial with the locking cone centerline.

18. The combination according to claim 17 wherein the cones of the lockable surfaces of the toolholder conform to the cones of the locking surfaces of the actuating nut and bolt, such that the shank is positively located about a longitudinal axis of the tool support member in a predetermined radial position.

* * * * *